(12) United States Patent
Boucherie

(10) Patent No.: US 8,951,035 B2
(45) Date of Patent: Feb. 10, 2015

(54) INJECTION MOLDING TOOL

(75) Inventor: Bart Gerard Boucherie, Izegem (BE)

(73) Assignee: GB Boucherie NV, Izegem (BE)

( * ) Notice: Subject to any disclaimer, the term of this patent is extended or adjusted under 35 U.S.C. 154(b) by 323 days.

(21) Appl. No.: 12/948,863

(22) Filed: Nov. 18, 2010

(65) Prior Publication Data

US 2011/0117233 A1  May 19, 2011

(30) Foreign Application Priority Data

Nov. 19, 2009 (EP) .................................. 09014465
Jul. 2, 2010 (EP) .................................. 10006886

(51) Int. Cl.
  *B29C 45/16* (2006.01)
  *B29L 31/42* (2006.01)
(52) U.S. Cl.
  CPC ........... *B29C 45/1628* (2013.01); *B29C 45/162* (2013.01); *B29L 2031/425* (2013.01)
  USPC ........... 425/441; 425/397; 425/402; 425/451; 264/255; 264/294
(58) Field of Classification Search
  USPC ........... 425/397, 402, 441, 451; 264/255, 294
  See application file for complete search history.

(56) References Cited

U.S. PATENT DOCUMENTS

| 2006/0068049 A1* | 3/2006 | Nishizawa ..................... 425/145 |
| 2009/0136610 A1* | 5/2009 | Boucherie ..................... 425/116 |
| 2011/0117233 A1 | 5/2011 | Boucherie | |

FOREIGN PATENT DOCUMENTS

| DE | 10121691 | * 11/2002 | ............. B29C 45/32 |
| EP | 2324981 A1 | 5/2011 | |
| WO | 2007085063 | 8/2007 | |

OTHER PUBLICATIONS

European Search Report Dated Apr. 23, 2010.
Extended European Search Report Dated May 23, 2012.

* cited by examiner

*Primary Examiner* — Jeremiah Smith
(74) *Attorney, Agent, or Firm* — Carlson, Gaskey & Olds, PC

(57) ABSTRACT

An injection molding tool is used to produce plastic parts such as toothbrush bodies or razor handles, for example. The tool has a stationary center mold block and a pair of outer mold blocks. The center mold block has two parallel opposed molding faces joined by two parallel opposed side faces extending perpendicular to the molding faces. The molding faces have parallel partial mold cavities formed therein and the outer mold blocks each are associated with one mold face of the center mold block and each have a molding face with parallel partial mold cavities formed therein which together with corresponding partial mold cavities of the associated mold face of the center mold block form complete mold cavities. Holders are indexed alongside the peripheral faces and around corners formed between the peripheral faces to hold and transport molded parts alongside the peripheral faces of the center mold block.

30 Claims, 12 Drawing Sheets

INJECTION MOLDING TOOL

RELATED APPLICATION

This application claims priority to European Patent Application No. 09 014 465.0, filed Nov. 19, 2009, and European Patent Application No. 10 006 886.5, filed Jul. 2, 2010.

FIELD OF THE INVENTION

The invention relates to an injection molding tool for producing molded parts in a variety of shapes and compositions, examples being razor handles, writing utensils, tool handles, toothbrushes etc., where the components may differ in hardness, color or some other property.

BACKGROUND

One particular type of a stacked injection molding tool which is disclosed in EP 1 957 254 A1 (Boucherie) has a center mold block in the form of a cube defined by four peripheral faces and a pair of spaced end faces joining the peripheral faces along peripheral edges, and a pair of opposed outer mold blocks. The center mold block has two of the peripheral faces forming parallel opposed molding faces joined by two parallel opposed side faces extending perpendicular to the molding faces. The molding faces have parallel partial mold cavities formed therein and the outer mold blocks are each associated with one mold face of the center mold block. The outer mold blocks also each have a molding face with parallel partial mold cavities formed therein which together with corresponding partial mold cavities of the associated mold face of the center mold block form complete mold cavities for molding parts such as brush bodies when the outer mold blocks are positioned close to the center mold block. Each molding face of the center mold block has an accommodation or recess or plural similar recesses for accommodation of movable mold inserts. The mold inserts each have fractions of the partial mold cavities formed therein. When brush bodies or parts thereof are molded by injecting a first component into the cavities defined between the molding faces of the center mold block and a corresponding outer mold block and the mold is opened by separating the outer mold block from the center mold block, the pre-molded parts adhere to the insert or inserts which then serve as holders and can be lifted out of the partial cavities in the molding face of the center mold block. While they are held on the inserts, the pre-molded parts are then moved to one of the two opposed side faces of the center mold block where they are allowed to cool for some time. Then the inserts with the pre-molded parts are moved to the other molding face of the center mold block where a second component is injected. The completed parts, toothbrush bodies in this case, still adhering to the inserts, are then moved to the other side face of the center mold block where they are ejected or removed by a robot.

For moving the inserts with equal indexing steps, a common drive with a pair of turrets is used in which the turrets are mounted on a common axis that crosses the center mold block centrally and parallel to its molding and side faces. For performing each indexing step, the turrets are rotated 90°. Although the common drive for the inserts has advantages in terms of simplicity and synchronization of molding operations and other functions, the inserts must be moved on a circle about the center mold block so that the space requirements are substantial.

SUMMARY

It has now been found that by moving the inserts alongside the faces of the center mold block and around the corners between joined faces of the center mold block, the space requirements are reduced substantially. The holders are lifted out of the mold cavities just the amount necessary for a free movement of the holders with the pre-molded parts thereon parallel to and closely spaced from the mold faces. In addition, more flexibility in terms of molding options and functionality can be achieved.

Accordingly, in one example of an injection molding tool, when the outer mold block is, or the outer mold blocks are, separated from the center mold block, the holders—which may be carriers of core members or mold inserts, for example—are movable with indexing steps alongside the two opposed molding faces, alongside the side faces and around the corners formed between the molding faces and the side faces of the center mold block. With this concept it is possible to use separate drives for different holders or groups of holders or mold inserts, and it is still possible to move the holders or mold inserts between indexing positions equally spaced about the center mold block. Usually, the holders would be moved between indexing positions at both of two opposed molding faces and at both side faces of the center mold block. This is the case when both side faces perform some function, such as cooling of pre-molded (partially molded) parts, feeding external parts to the pre-molded parts for subsequent over-molding with another molding component, feeding of tufts of bristles in the case of molding brushes such as toothbrushes, some processing or finishing operation, or ejection of finished parts. However, in some applications only one side face of the center mold block may need to perform one of these functions. In that case the holders are moved between indexing positions at both molding faces and at only one of the side faces of the center mold block. As a consequence, less holders or less of the rather expensive inserts are needed in this application.

In the injection molding tool of EP 1 957 254 A1, the number of components from which brush bodies can be molded is strictly limited to two, each molding face of the center mold block being associated with a different one of the two components. In an advantageous embodiment of the invention, the number of components from which parts can be molded is basically unlimited. This is achieved with an embodiment where the molding faces of the center mold block and the outer mold blocks form two or more adjacent sets of parallel mold cavities. The holders or mold inserts are movable by indexing steps from one of the adjacent sets of mold cavities to another one of the adjacent sets of mold cavities. It is now possible that the adjacent sets of mold cavities are supplied with different molding materials or the same molding material in different mold cavities, if the end product so requires.

These and other features of the present invention can be best understood from the following specification and drawings, the following of which is a brief description.

BRIEF DESCRIPTION OF THE DRAWINGS

Further advantages and features of the invention will become apparent from the following detailed description of several embodiments with reference to the appending drawings.

DETAILED DESCRIPTION

Figure 1:
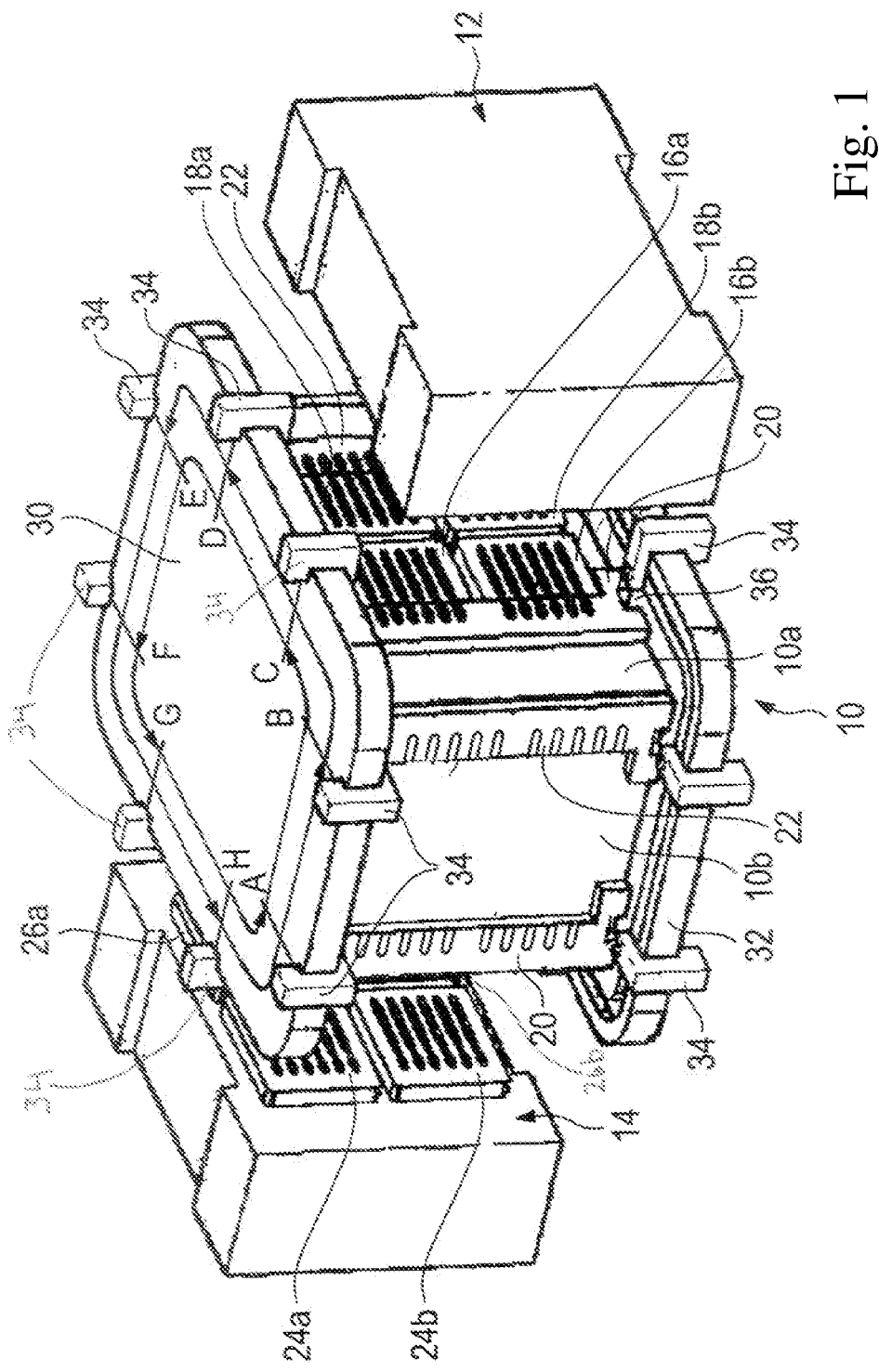
FIG. 1 is a perspective view of an injection molding tool according to a first embodiment shown in an open condition of the mold blocks.

The injection molding tool is generally intended to produce plastic parts by injection molding from at least two molding components. Examples are razor handles, writing utensils, tool handles etc., where the components may differ in hardness, color etc., but it should be clear that other kinds of two-component or multiple-component molded parts can be produced with a molding tool of similar configuration. However, by way of example, the embodiments shown in FIGS. 1 to 6 are intended for producing toothbrush bodies from up to four different molding components.

The molding tool is essentially composed of a center mold block 10 having a cube shape and two outer mold blocks 12, 14 located on opposed sides of the center mold block 10. The center mold block is stationary and has four peripheral faces and a pair of spaced end faces joining the peripheral faces along peripheral edges. Two opposed peripheral faces of the center block are molding faces 10a and two other peripheral faces are side faces 10b joining the molding faces 10a at corners. Each molding face 10a is equipped with cavity plates which, in the embodiment shown, are a first set of similar cavity plates 16a, 16b and a second set of similar cavity plates 18a, 18b, these cavity plates being rectangular in shape and located side by side. Alongside an outer edge of each set of cavity plates 16a, 16b and 18a, 18b a holder forming an insert 20 and 22 respectively is received in a corresponding accommodation or recess formed in the molding face 10a adjacent an outer edge of the corresponding set of cavity plates. Partial cavities are recessed in the cavity plates and the inserts such that a fraction corresponding to a brush head is formed in the insert and the remaining fraction corresponding to a brush handle in the cavity plates, both fractions together forming a partial cavity to be completed with a corresponding partial cavity on the outer mold block 12. The opposed molding face of center mold block 10 is equipped with similar cavity plates and inserts as is readily understood when the corresponding molding face of outer mold block 14 is considered which has two sets of cavity plates 24a, 24b and 26a, 26b with partial cavities comprising both the head part and the handle part of a toothbrush body.

In this embodiment of the molding tool, one of the molding faces 10a is associated with a first molding component which is thus injected into all cavities on the corresponding side of the tool, and the other one of the molding faces is associated with a second molding component which is thus injected into all cavities on the other side of the tool. For example, the first component may be of a relatively hard plastic to form a pre-mold of the toothbrush bodies and the second component may be of a relatively soft material such as an elastomer to form resilient and possibly differently colored parts of the toothbrush. Although the cavities shown look generally similar on both sides of the molding tool, it should be understood that they conform to the requirements of each component and can thus be different on both sides.

Figure 2:
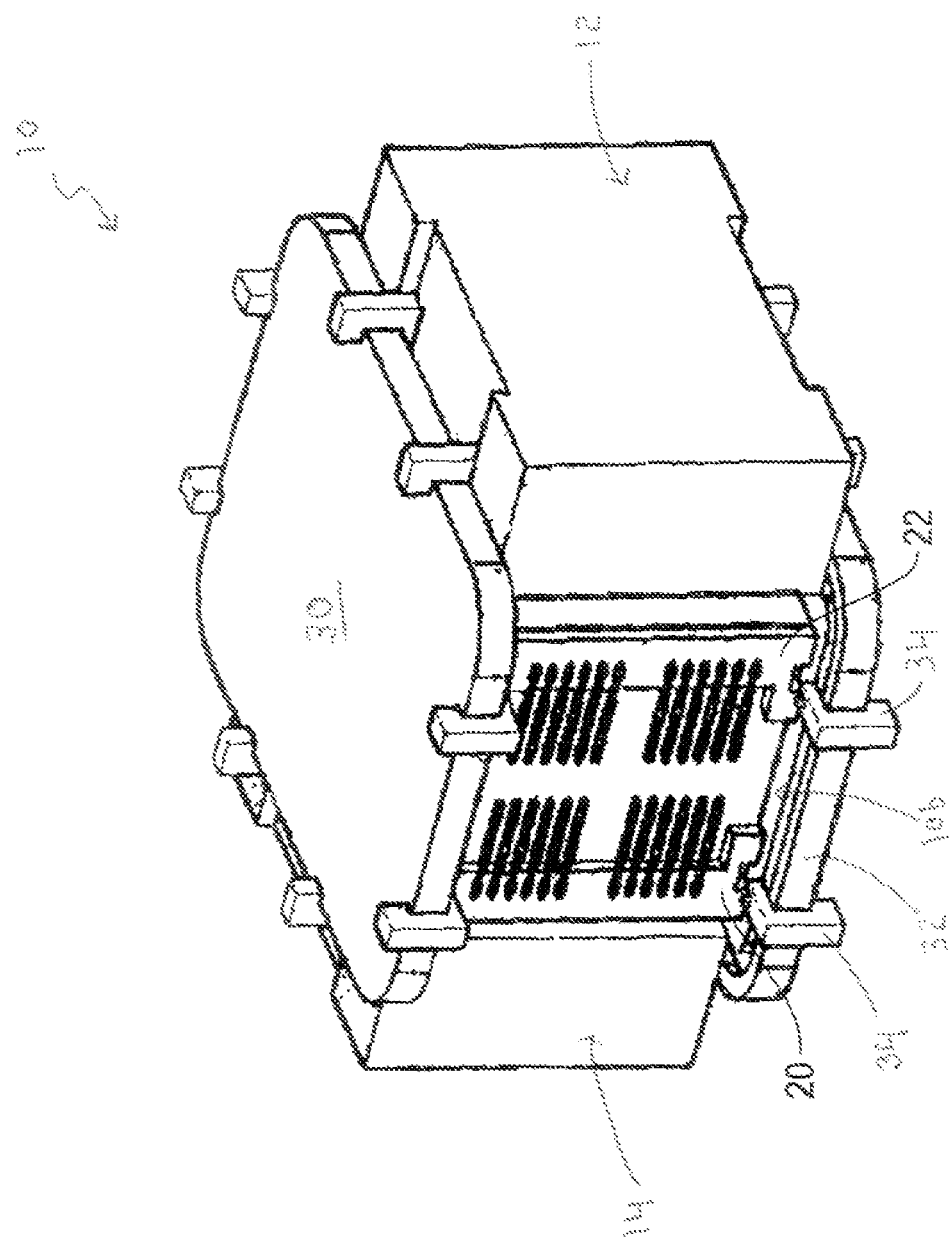
FIG. 2 is a perspective view of the injection molding tool shown in a closed condition of the mold blocks.

For performing injection shots simultaneously on both sides of the molding tool, the outer mold blocks 12 and 14 are moved into close contact with the molding faces of the center mold block 10, as shown in FIG. 2. While the injection proceeds, two sets of completed brush bodies are presented to the side face 10b seen in FIG. 2, as held by inserts 20 and 22 and ready for ejection. In fact, the side face 10b seen in FIG. 2 can be considered part of an ejection station, while the opposed side face can be considered part of a cooling station.

In the embodiment of FIGS. 1 and 2, each molding face 10a and each side face 10b has one set of inserts 20, 22 temporarily associated with it, but it is necessary to move the sets of inserts 20, 22 synchronously and in equal indexing steps from one face of the center mold block to the next. Movement of the inserts is ensured by a drive system capable of moving the inserts alongside the four faces of the center mold block and around each corner joining two such faces. The drive system comprises a pair of parallel spaced guide plates 30, 32 of rectangular shape, each adjacent to one of the end faces of the center mold block. U-shaped sliders 34 are engaged on the outer edge of each guide plate 30, 32 to move along the edge all around the corresponding guide plate. Each insert 20, 22 can be releasably engaged with a pair of sliders 34 opposed to each other on both guide plates 30, 32. As seen in FIG. 1, the inserts are formed with notches 36 into which a leg of a slider 34 can engage when the insert in front of it is lifted out of the recess in the molding face, so that the inserts are moved along with the sliders.

The sliders 34 are coupled to a drive mechanism yet to be described and capable of moving each pair of opposed sliders, and thus each insert, between fixed indexing positions which are marked A to H in FIG. 1, along trajectories schematically indicated in FIG. 1 by arrows. In an initial state, the inserts 20, 22 seen on side face 10b in FIG. 1 are empty, but pre-molded parts are seen on molding face 10a in FIG. 1 ready for being transferred to the cooling station on the next side face with an indexing step. With this indexing step, a first insert 20 is moved from position C to position E, and a second insert 22 is simultaneously moved from position D to position F. At the same time, a pair of inserts are moved from positions E and F to positions G and H, another pair of inserts is moved from positions G and H to positions A and B, and the fourth pair of inserts is moved from positions A and B to positions C and D.

Figure 3:
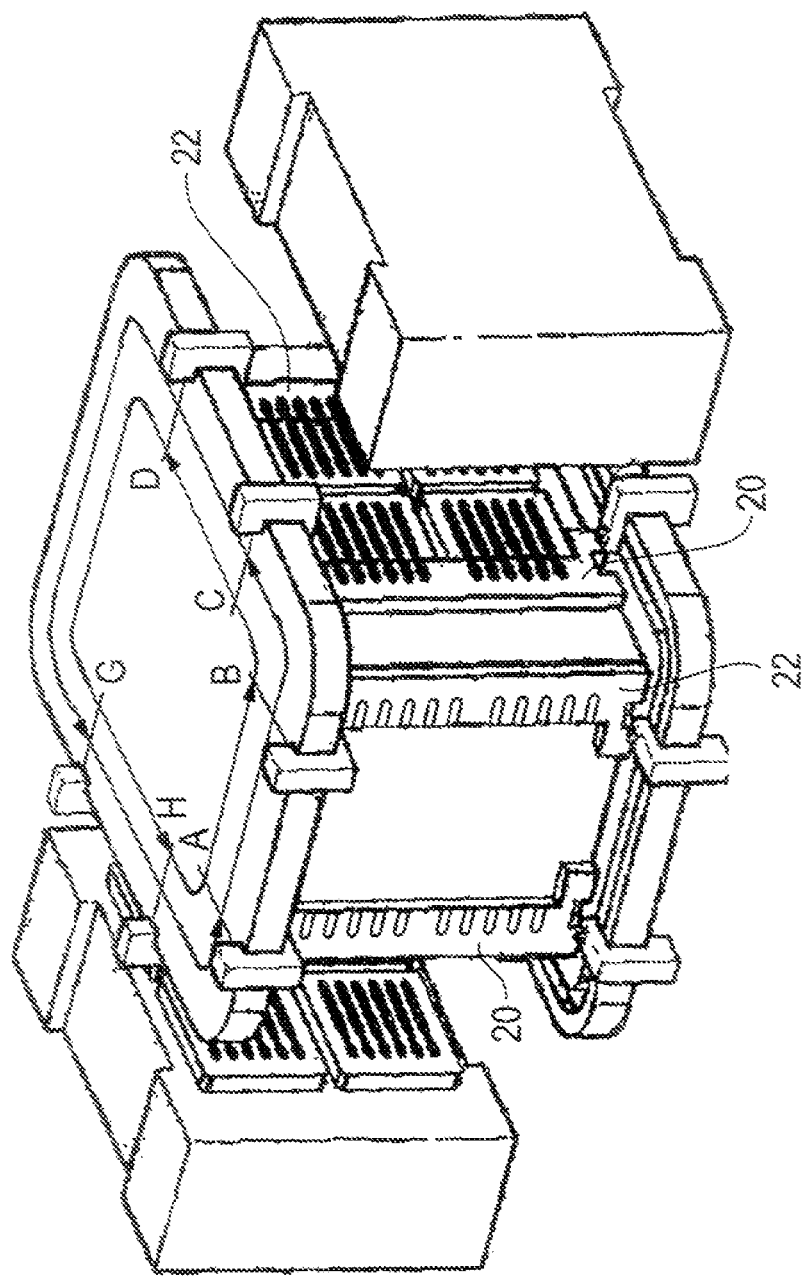
FIG. 3 is a perspective view of an injection molding tool according to a second embodiment shown in an open condition of the mold blocks.

Depending on the nature of molded products and on the molding materials involved, it may not be necessary to have a cooling station between the molding stations for the first and second molding components. In the embodiment of FIG. 3, which is generally similar to that previously considered, only six of the rather expensive movable inserts, i.e. two less, are needed.

As seen in FIG. 3, the only difference over FIGS. 1 and 2 is that each pair of inserts is moved from positions C and D directly to positions H and G with an enlarged indexing step alongside part of both molding faces and alongside the intervening side face and around the corners between these faces. The smaller indexing steps between positions G, H and A, B as well as A, B and C, D remain the same.

Figure 4:
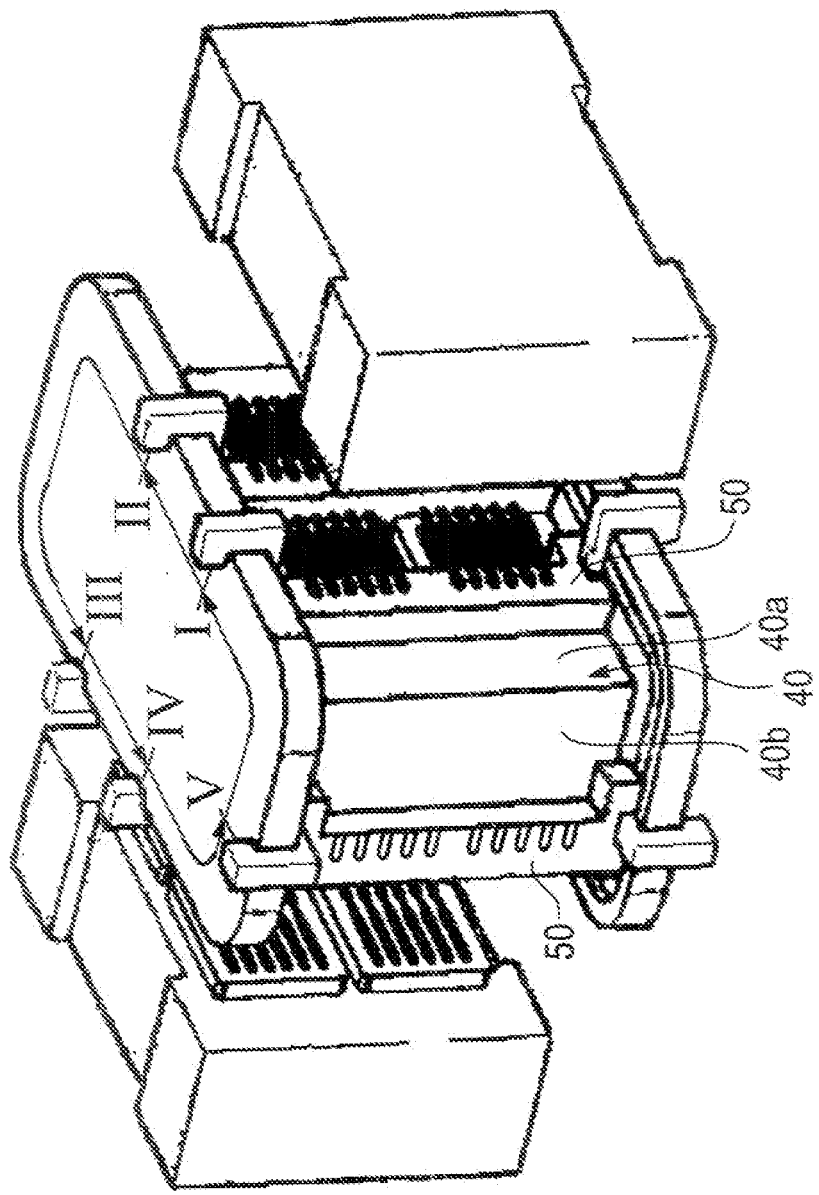
FIG. 4 is a perspective view of an injection molding tool according to a third embodiment shown in an open condition of the mold blocks.

Turning to the embodiment of FIG. 4, the advantages of the flexible indexing concept will become fully apparent.

In this embodiment the center mold block 40 has a pair of opposed molding faces 40a similar to the previous embodiment, but the cavity plates in each set can be associated with a different molding component so that a total of four different molding components can be injected with the same tool. Concomitantly, the inserts 50 are moved with variable indexing steps between positions that include adjacent positions on the same molding face. In the example shown, the inserts 50 move a small indexing step from position I to position II on the same molding face 40a, then from position II to position III on the opposed molding face 40a with a large indexing step, then from position III to position IV on the same opposed molding face with a small indexing step, from position IV to position V on a side face 40b of the center mold block and finally from position V to position I.

In the example shown, the side faces 40b are only about half as wide as the molding face 40a and only one of the side faces is functional, i.e. forms an ejection station for molded parts. It is however easy to incorporate various kinds of processing stations distributed around the center mold block in an appropriate sequence. For example, the ejection station on one of the side faces could be preceded by a finishing station located on the same side face; in that case, the width of the side face would be such as to accommodate more than just a single insert 50, similar to the first or second embodiment above. Likewise, the opposite side face of the center core could be functional, e.g. form a cooling station or have some other intermediate function. An interesting option is to add a tuft feeding station which would be situated upstream from the station where the first component is injected. Also, the number of sets of cavity plates is not limited to four; it would be easy to expand the concept to any desired number of molding components by just adding more sets of cavity plates on the molding faces of the center mold block. In all these cases, the indexing steps for the inserts would be adjusted as appropriate so that each insert is moved through the entire sequence of functional stations.

When reference is made in the above description to an "insert" that fits into a "recess", it should be clear that the basic principle of this invention requires only a holder that is moved with suitable indexing steps between the various molding and processing stations around the center mold block, the holder carrying pre-molded parts in succession through all of these stations. The insert can define part of the mold cavity as a complement of a mold plate, as shown. It can fit into a recess of the mold plate or into a suitable accommodation and constitute a movable part of a split mold plate.

Figure 5:
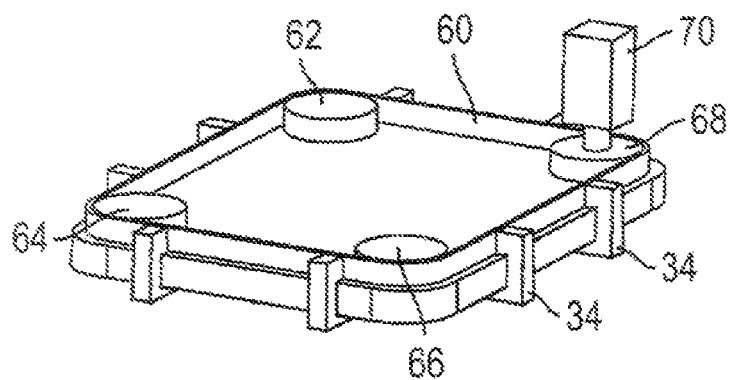
FIG. 5 is a perspective view of a common insert drive system.

The insert drive system shown in FIG. 5 is suitable for an embodiment where all inserts are moved synchronously by indexing steps of same size, as is the case with the embodiment of FIGS. 1 and 2. The drive system in this embodiment has an endless drive belt 60 trained about rollers 62, 64, 66 and 68 of which the latter 68 is driven by a motor 70 while all others are idle rollers. The rollers 62-68 are appropriately located at the corners of each guide plate on an associated end face of the center mold block, it being understood that the entire drive system comprises two of the arrangements shown in FIG. 5, one for each end face of the center mold block. The sliders 34 are coupled to the drive belt 60 at equal distances corresponding to the predetermined indexing positions as shown.

Figure 6:
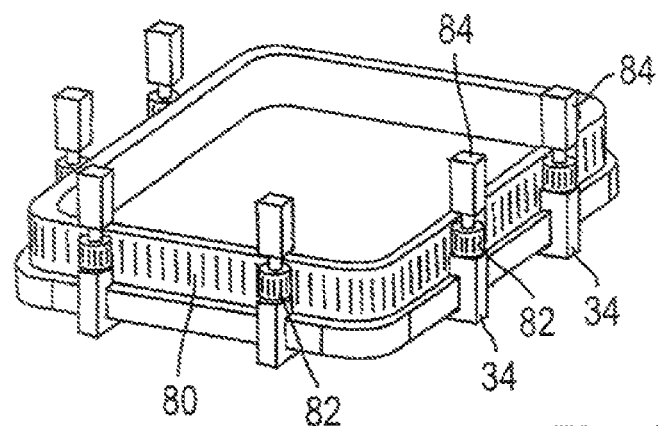
FIG. 6 is a perspective view of an insert drive system for individual insert movement.

The insert drive system shown in FIG. 6 is suitable for an embodiment where the inserts can move independently of each other, as is the case with the embodiment of FIG. 3 or FIG. 4. The drive system in this embodiment comprises a rack or rail member 80 that extends continuously along the entire outer edge of each guide plate on an associated end face of the center mold block. The rack or rail member 80 has some regular engagement structure such as a toothing on its outer face. Each of the sliders 34 is associated with a pinion 82 driven by a small individually controllable motor 84 and in meshing engagement with the toothing of the rack or rail member 80. The motors 84 are preferably electric servo-motors or step motors, but other types such as hydraulic are also possible. The motors 84 are controlled to move the sliders 34 and the inserts connected thereto with the required indexing steps between the various indexing positions, as described with reference to FIGS. 3 and 4. With this insert driving system, the inserts can be moved individually with controllable indexing steps of any size.

Next, an embodiment will be disclosed with reference to FIGS. 7 to 13 where the parts to be produced are razor handles or similar items.

Figure 7:
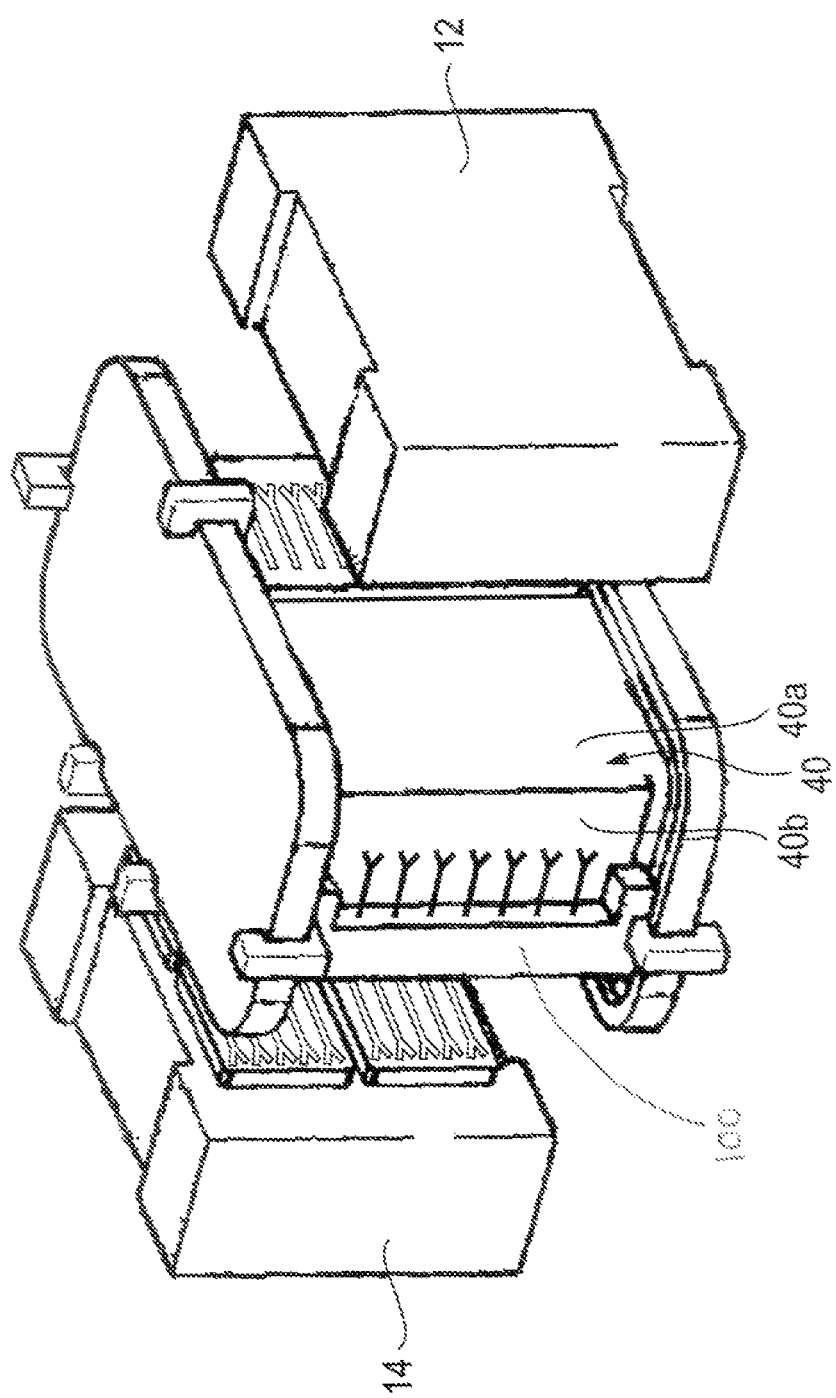
FIG. 7 is a perspective view of the injection molding tool according to a fourth embodiment shown in an open condition of the mold blocks.

In FIG. 7, the general constitution of the molding tool is similar to that of FIG. 4 and like reference numerals designate similar parts. In this embodiment, a total of five holders 100 are used, each of which carries a number of pin-like core members corresponding to the number of mold cavities in a set. The holders 100 are moved by a drive system in a manner very similar to that used for the inserts 50 in the FIG. 4 embodiment. The molding tool in this embodiment has three sets of mold cavities for molding three different components, two sets on the side of outer movable mold block 14 and one set on the side of movable outer mold block 12. Next to one side face 40b of the center mold block 40 separate external parts are fed for combination with pre-molded parts as will be explained, and on the opposed side face completed parts are ejected.

Figure 8:
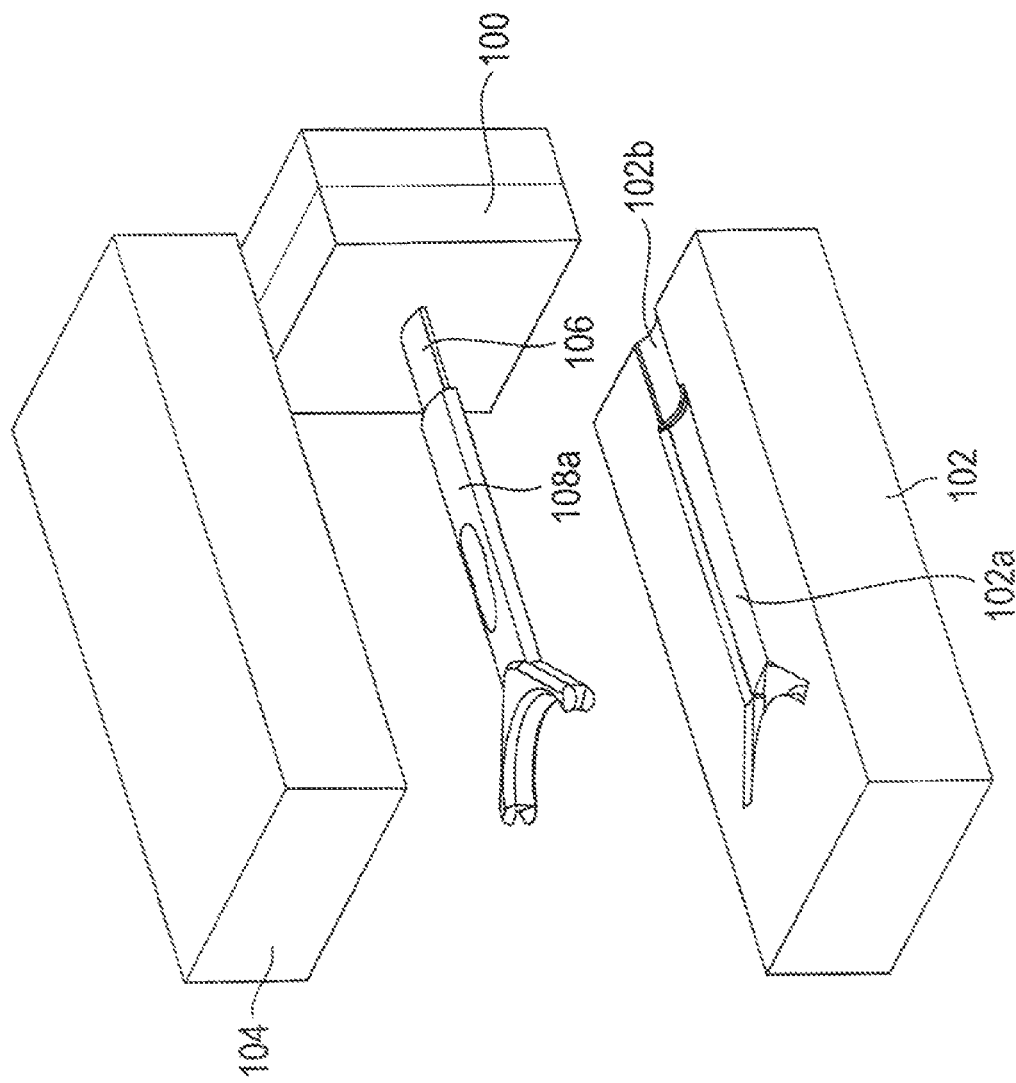
FIG. 8 is a perspective view illustrating a single mold unit of the fourth embodiment after injection of a first molding component.

With reference to FIG. 8 which shows separated mold blocks 102 and 104 of a single mold unit, part of a holder 100 is seen which carries a flat pin-like core member 106 over which a pre-molded part 108a is formed by injection of a first molding component into the corresponding mold cavity of which a partial cavity 102a is seen in mold block 102. Partial cavity 102a is contiguous with a recess 102b for accommodation of a root part of core member 106.

Figure 9:
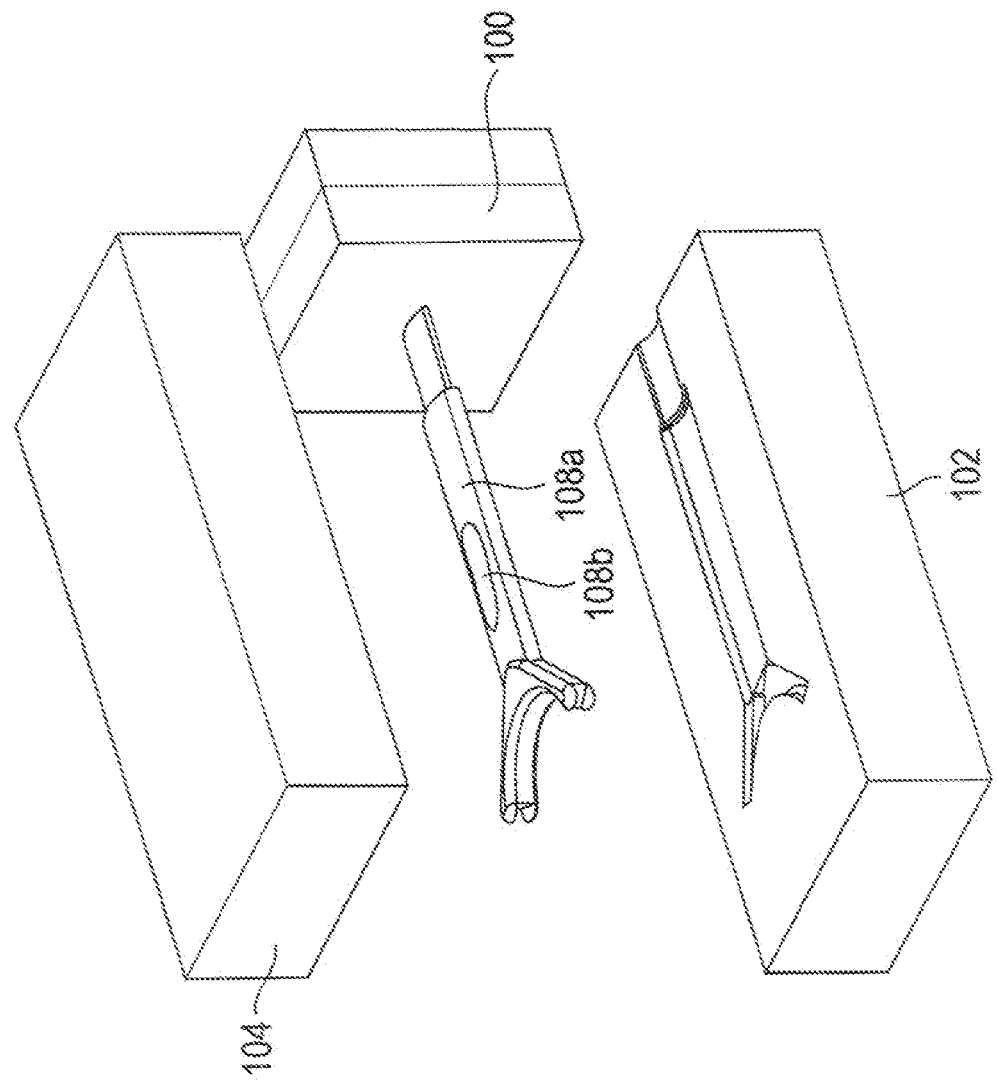
FIG. 9 is a perspective view illustrating a single mold unit of the fourth embodiment after injection of a second molding component.

After the first molding shot, the pre-molded parts 108a held on the core members 106 are moved by holders 100 to the next set of mold cavities for injection of a second molding component, as illustrated in FIG. 9. Here, only a small depression left in the pre-molded part 108a is filled with the second component, as seen at reference numeral 108b.

Figure 10:
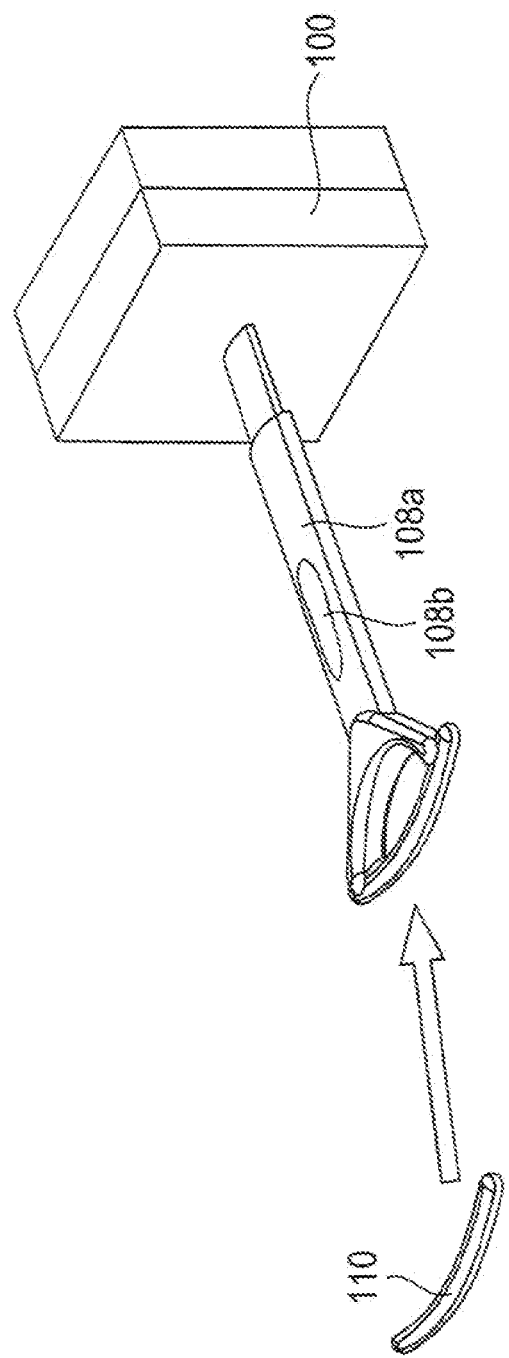
FIG. 10 is a perspective view illustrating the feeding of an external part to be joined with a pre-molded part.

Next, the pre-molded parts 108a, 108b are moved by holders 100 to a feeding station located adjacent the side face 40b seen in FIG. 7. With reference to FIG. 10, a separate external part 110 is supplied and combined with the pre-molded part 108a, 108b. Part 110 can be metallic or of some other material. As seen in FIG. 10, part 110 in this example is a slightly bent rod which on its free ends is engaged in a groove formed on the ends of fork-like arms of pre-molded part 108a, 108b.

Figure 11:
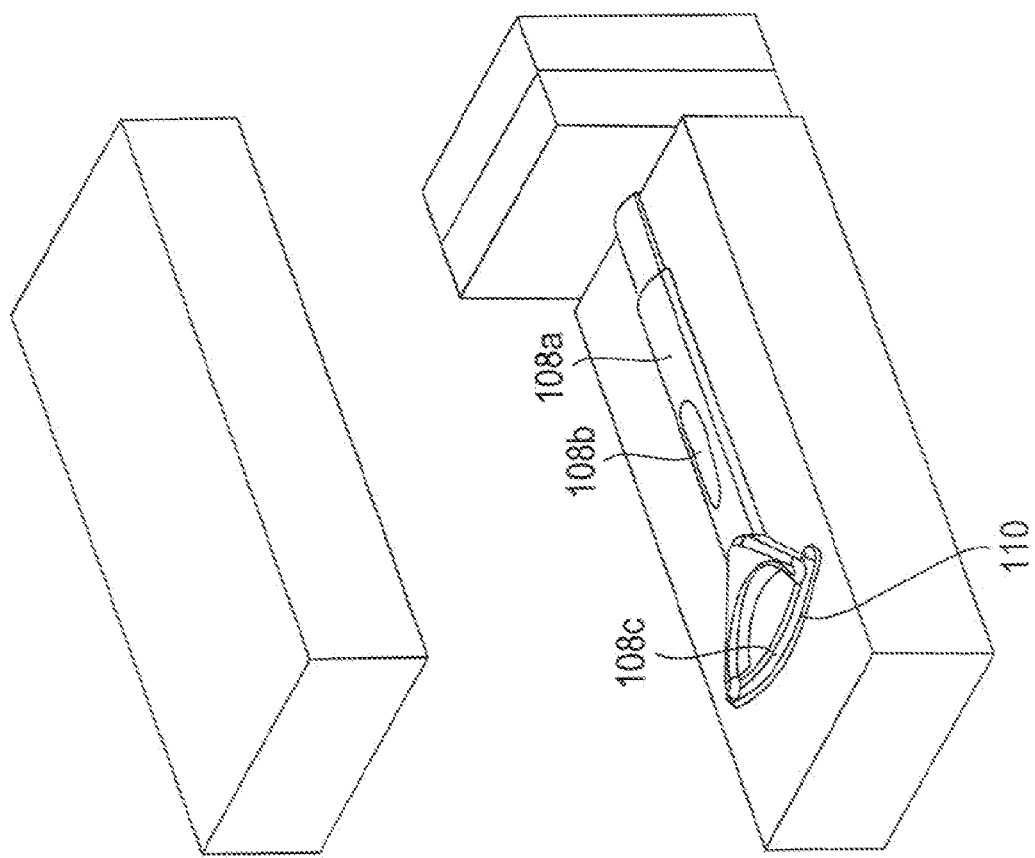
FIG. 11 is a perspective view illustrating a single mold unit of the fourth embodiment after injection of a third molding component.

A final shot with a third molding component occurs in the third set of mold cavities on the side of mold block 12, a single mold unit of the third set being illustrated in FIG. 11. The third molding component is injected next to the external part 110 as seen at reference numeral 108c. In this example, the third component at 108c acts to firmly connect the external part 110 with the fork-like end of pre-molded part 108a, 108b.

Figure 12:
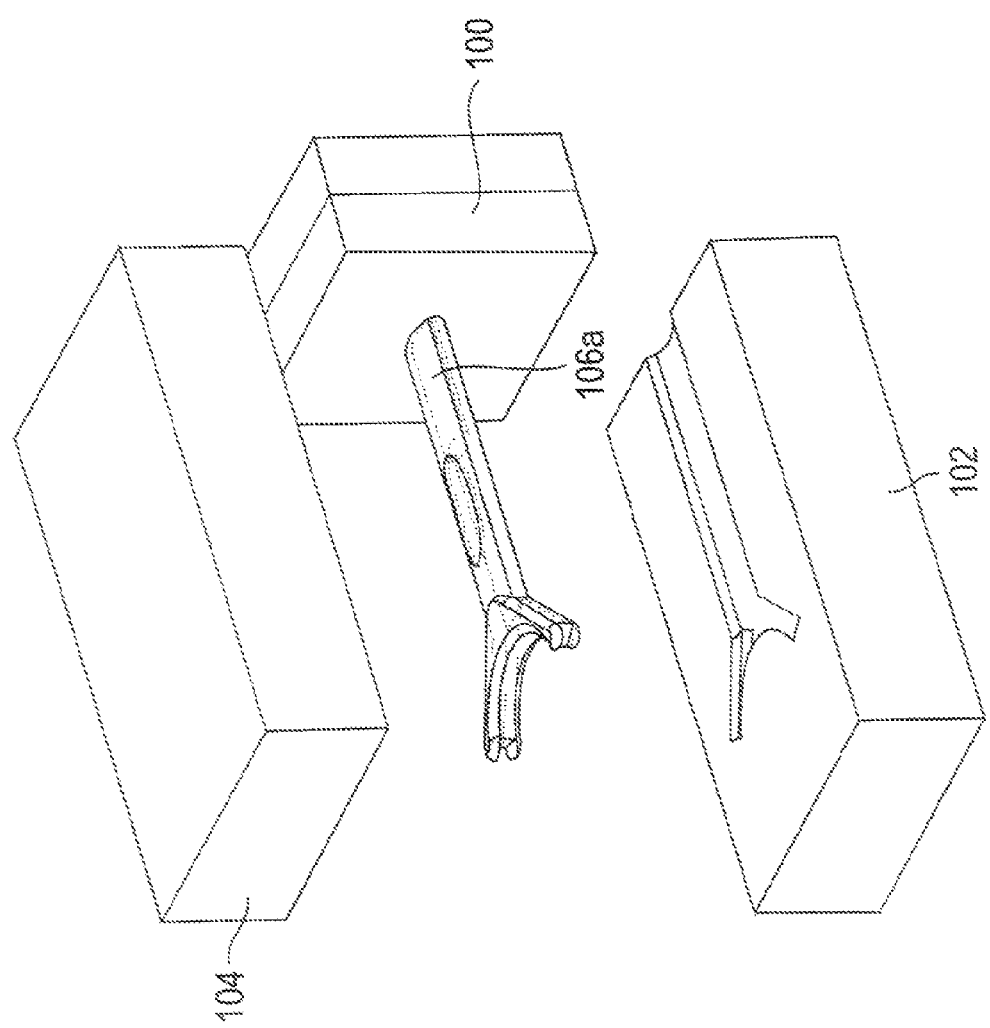
FIG. 12 is a perspective view illustrating an alternative single mold unit of the fourth embodiment after injection of a first molding component.
Figure 13:
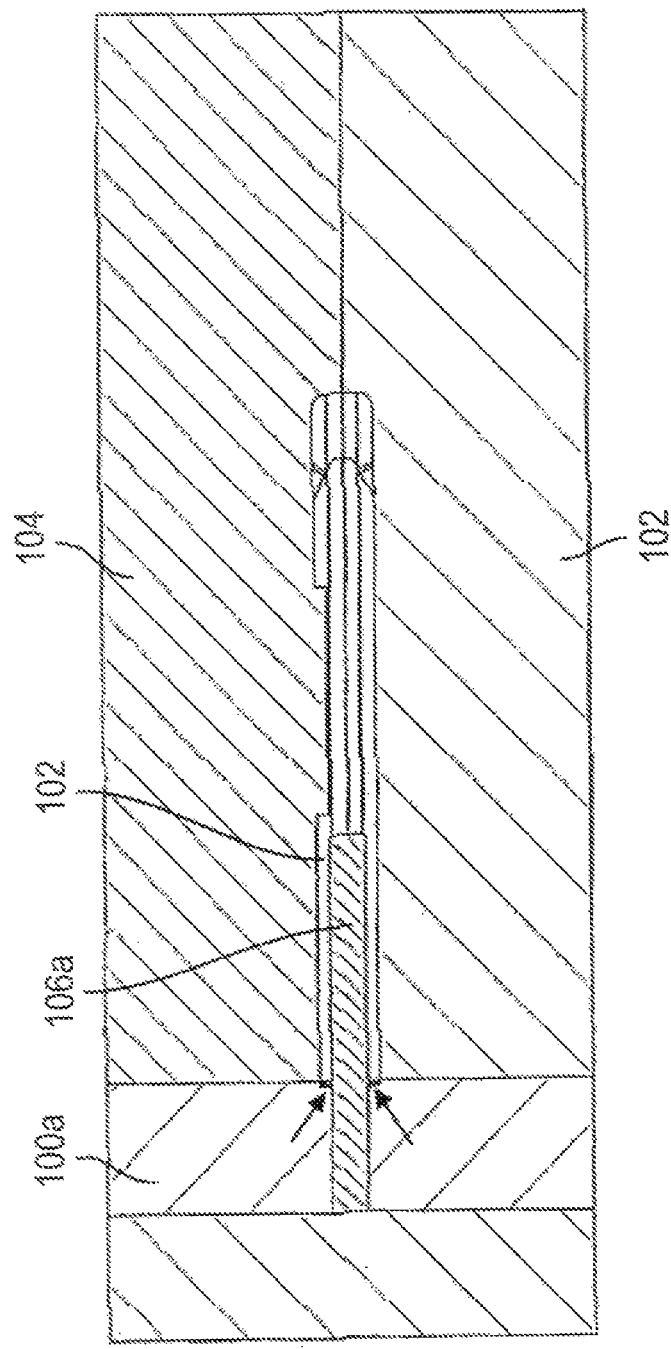
FIG. 13 is a longitudinal section of the single mold unit shown in FIG. 12.

In the alternative embodiment of FIG. 12, the mold cavity is moved close to the holder 100a (FIG. 13) and the core member 106a is entirely covered by the first mold component from which the pre-molded part 108a is made. In all other respects, the mold unit in the first set of mold cavities is similar to that in FIG. 8, just as the mold units in the subsequent sets of mold cavities. As is seen in FIG. 13, the mold cavity 102 is defined between mold blocks 102, 104 and also a small annular surface of holder 100a around the base of core member 106a (small arrows in FIG. 13 point to the small annular surface).

As is easily understood, the embodiment of FIG. 7 leaves free space on the side of mold block 12 where only the third set of mold cavities is arranged, and the free space would be used in further developments to accommodate some other functionality, e.g. injection of a fourth molding component, cooling of the molded parts prior to ejection, or even feeding the external parts so that side face 40b would be available for some other functionality.

In still further embodiments an in-feed of external parts occurs upstream of the first set of molding cavities. The external part is e.g. attached to or inserted in the core member of the holder prior to movement of the holder to the first molding station. Alternatively, an external part is attached to the core member, or inserted into the core member or into a partial cavity of the first molding station, followed by a first injection, a second injection, possibly a third injection, followed by e.g. ejection or removal in the first station, and immediately thereafter a new external part is supplied and a new cycle is started.

Although the invention has been described hereinabove with reference to a specific embodiment, it is not limited to this embodiment and no doubt further alternatives will occur to the skilled person that lie within the scope of the invention as claimed.

What is claimed is:

1. An injection molding tool for producing molded plastic parts, comprising:
    a stationary center mold block and at least one movable outer mold block, the stationary center mold block having peripheral faces joined by corners, at least one of the peripheral faces being a molding face which cooperates with the at least one movable outer mold block, the molding face and the at least one outer mold block defining mold cavities for molding molded parts;
    at least two holders which are adjacent to each other and are movable with indexing steps of differing size relative to each other and closely alongside the peripheral faces and around the corners formed between the peripheral faces of the stationary center mold block for holding and transporting molded parts alongside the peripheral faces of the stationary center mold block;
    core members for a molded part connected to the holders; and
    wherein each holder is configured to lift each core member out of the mold cavities just an amount of space necessary for a free movement of the holders with the molded parts thereon and wherein each holder is substantially parallel to each peripheral face during indexing.

2. The injection molding tool according to claim 1, wherein the stationary center mold block has a pair of parallel spaced end faces joined by the peripheral faces along peripheral edges and the at least one holder is guided and driven along said peripheral edges.

3. The injection molding tool according to claim 1, wherein core members are adapted to be inserted in the mold cavities for molding molded parts over said core members.

4. The injection molding tool according to claim 3, wherein the at least one holder includes surface areas adjacent the core members which define a fraction of a mold cavity into which a corresponding core member is inserted.

5. The injection molding tool according to claim 1, wherein at least one of the peripheral faces of the stationary center mold block is adjacent to a functional station comprising at least one of a cooling station, finishing station, feeding station, ejection or removal station, processing station, or empty station without function.

6. The injection molding tool according to claim 5, wherein the functional station comprises at least a feeding station, and wherein the feeding station adds structural external parts prior to molding of a molding component in a set of mold cavities.

7. The injection molding tool according to claim 1, wherein sets of mold cavities are arranged on a pair of molding faces formed by two opposed peripheral faces of the stationary center mold block, each molding face of said pair of molding faces being associated with a corresponding movable outer mold block.

8. The injection molding tool according to claim 1, wherein the at least one holder is a mold insert that fits into a corresponding accommodation in the molding face of the stationary center mold block, the mold insert having a first set of partial mold cavities forming a fraction of the molded parts, and wherein the mold cavities in the stationary center mold block form a second set of partial mold cavities that provide a remaining fraction of the molded parts such that the first and second sets of partial mold cavities comprise complete partial mold cavities for a portion of the molded parts that is formed within the stationary center mold block and mold insert.

9. The injection molding tool according to claim 8, wherein at least two sets of mold cavities are arranged on a pair of molding faces formed by two opposed peripheral faces of the stationary center mold block, each molding face of said pair of molding faces being associated with a corresponding movable outer mold block.

10. The injection molding tool according to claim 8, wherein the mold cavities in the outer mold block comprise partial mold cavities that align with the partial mold cavities in the stationary center block to provide complete mold cavities for the molded parts, and wherein the partial mold cavities in the stationary center block include a partial cavity formed by the stationary center block and an insert.

11. An injection molding tool according to claim 1, wherein the indexing steps define separate indexing positions equally spaced about the stationary center mold block.

12. An injection molding tool according to claim 1, wherein the mold cavities defined by the stationary center mold block and the at least one outer mold block form at least two adjacent sets of parallel mold cavities, and with the at least one holder being movable by the indexing steps from one of the adjacent sets of parallel mold cavities to another one of the adjacent sets of parallel mold cavities.

13. An injection molding tool according to claim 12, wherein the adjacent sets of parallel mold cavities are supplied with different molding materials.

14. The injection molding tool according to claim 1, wherein the at least two holders comprises at least a first holder and a second holder adjacent to the first holder, and wherein the indexing steps comprise at least a first indexing step where the first holder travels a first distance and a second indexing step where the second holder travels a second distance that is less than or greater than the first distance.

15. The injection molding tool according to claim 14, including a drive system configured to independently control movement of the first holder along the first distance and movement of the second holder along the second distance.

16. The injection molding tool according to claim 15, wherein the drive system comprises a motor that drives a slider associated with the holders along a rail.

17. The injection molding tool according to claim 1, wherein the holder is movable through variable indexing steps between positions that include adjacent positions on a common molding face.

18. The injection molding tool according to claim 1, wherein the at least one holder comprises a plurality of holders that are moveable independently of each other through indexing steps of differing size during indexing from one peripheral face to an opposite peripheral face.

19. The injection molding tool according to claim 1, wherein each holder is parallel to each peripheral face during each indexing step.

20. The injection molding tool according to claim 1, wherein the at least one holder is moved by a drive system which includes exactly one stationary rail or a pair of stationary rails, each stationary rail being arranged at an end face of the stationary center mold block, and sliders moving along each stationary rail.

21. An injection molding tool for producing molded plastic parts, comprising:
    a stationary center mold block and at least one movable outer mold block, the stationary center mold block having peripheral faces joined by corners, at least one of the peripheral faces being a molding face which cooperates with the at least one movable outer mold block, the molding face and the at least one outer mold block defining mold cavities for molding molded parts;
    at least one holder which is movable with indexing steps closely alongside the peripheral faces and around the corners formed between the peripheral faces of the stationary center mold block such that the at least one holder closely faces each peripheral face during indexing, the at least one holder for holding and transporting molded parts alongside the peripheral faces of the stationary center mold block, and wherein the stationary center mold block and the at least one outer mold block define at least two sets of mold cavities for injecting different components in each set of mold cavities, and the at least one holder is adapted to move molded parts between sets of mold cavities;
    wherein the at least one holder is moved by a drive system which includes exactly one stationary rail or a pair of stationary rails, each stationary rail being arranged at an end face of the stationary center mold block, and sliders moving along each stationary rail;
    at least one core member for a molded part connected to the at least one holder; and
    wherein each holder is configured to lift each core member out of the mold cavities just an amount of space necessary for a free movement of the holders with the molded parts thereon and wherein each holder is substantially parallel to each peripheral face during indexing.

22. The injection molding tool according to claim 21, wherein each holder is parallel to each peripheral face during each indexing step.

23. The injection molding tool according to claim 21, wherein the at least one holder comprises at least a first holder and a second holder adjacent to the first holder, and wherein the indexing steps comprise at least a first indexing step where the first holder travels a first distance and a second indexing step where the second holder travels a second distance that is less than or greater than the first distance.

24. The injection molding tool according to claim 21, wherein each holder remains substantially parallel to each associated peripheral face encompassed by an indexing where the holders are indexed from one peripheral face to an opposite peripheral face.

25. An injection molding tool for producing molded plastic parts, comprising:
    a stationary center mold block and at least one movable outer mold block, the stationary center mold block having peripheral faces joined by corners, at least one of the peripheral faces being a molding face which cooperates with the at least one movable outer mold block, the molding face and the at least one outer mold block defining mold cavities for molding molded parts;
    at least one holder which is movable with indexing steps closely alongside the peripheral faces and around the corners formed between the peripheral faces of the stationary center mold block for holding and transporting molded parts alongside the peripheral faces of the stationary center mold block;
    at least one core member for a molded part connected to the at least one holder, wherein each holder is configured to lift each core member out of the mold cavities just an amount of space necessary for a free movement of the holders with the molded parts thereon and wherein each holder is substantially parallel to each peripheral face during indexing; and
    wherein the at least one holder is moved by a drive system which includes exactly one stationary rail or a pair of stationary rails, wherein each stationary rail is arranged at an end face of the stationary center mold block, and sliders configured to move along each stationary rail.

26. The injection molding tool according to claim 25, wherein the at least one holder closely faces each peripheral face at the amount of space necessary for free movement during indexing such that each holder is parallel to each peripheral face during each indexing step.

27. The injection molding tool according to claim 25 wherein each stationary rail extends completely around the stationary center mold block, and wherein at least one of the sliders couples the at least one holder to stationary rail such that the slider slides the holder along the stationary rail completely around the stationary center mold block.

28. An injection molding tool for producing molded plastic parts, comprising:
    a stationary center mold block and at least one movable outer mold block, the stationary center mold block having peripheral faces joined by corners, at least one of the peripheral faces being a molding face which cooperates with the at least one movable outer mold block, the molding face and the at least one outer mold block defining mold cavities for molding molded parts;
    at least two holders for holding and transporting molded parts alongside the peripheral faces of the stationary center mold block, wherein the at least two holders are independently movable relative to each other with indexing steps of differing size closely alongside the peripheral faces and around the corners formed between the peripheral faces of the stationary center mold block;

wherein the at least two holders are moved by a drive system which includes exactly one stationary rail or a pair of stationary rails, each stationary rail being arranged at an end face of the stationary center mold block, and sliders moving along each stationary rail;

at least one core member for each molded part connected to at least one holder;

wherein each holder is configured to lift each core member out of the mold cavities just an amount of space necessary for a free movement of the holders with the molded parts thereon and wherein each holder is substantially parallel to each peripheral face during indexing.

29. The injection molding tool according to claim 28, wherein each holder is closely moveable alongside each peripheral face at the amount of space necessary for free movement and around the corners formed between the peripheral faces of the stationary center mold block at the amount of space necessary for free movement such that each holder is parallel to each peripheral face during each indexing step.

30. The injection molding tool according to claim 28, wherein the at least two holders comprises at least a first holder and a second holder adjacent to the first holder, and wherein the indexing steps comprise at least a first indexing step where the first holder travels a first distance and a second indexing step where the second holder travels a second distance that is less than or greater than the first distance.

* * * * *